US012599872B2

(12) United States Patent
Kaneda et al.

(10) Patent No.: US 12,599,872 B2
(45) Date of Patent: Apr. 14, 2026

(54) DENITRATION CATALYST AND METHOD FOR PURIFYING EXHAUST GAS

(71) Applicant: MITSUBISHI HEAVY INDUSTRIES, LTD., Tokyo (JP)

(72) Inventors: Shimpei Kaneda, Tokyo (JP); Keiichiro Kai, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 449 days.

(21) Appl. No.: 18/019,610

(22) PCT Filed: Aug. 4, 2021

(86) PCT No.: PCT/JP2021/028879
§ 371 (c)(1),
(2) Date: Feb. 3, 2023

(87) PCT Pub. No.: WO2022/030521
PCT Pub. Date: Feb. 10, 2022

(65) Prior Publication Data
US 2023/0285950 A1 Sep. 14, 2023

(30) Foreign Application Priority Data

Aug. 4, 2020 (JP) ................................. 2020-132650

(51) Int. Cl.
*B01J 35/56* (2024.01)
*B01D 53/86* (2006.01)
(Continued)

(52) U.S. Cl.
CPC .......... *B01D 53/8628* (2013.01); *B01J 21/12* (2013.01); *B01J 23/28* (2013.01); *B01J 35/56* (2024.01);
(Continued)

(58) Field of Classification Search
None
See application file for complete search history.

(56) References Cited

U.S. PATENT DOCUMENTS 5,157,010 A 10/1992 Maus et al.
2010/0143223 A1 6/2010 Ando et al.
(Continued)

FOREIGN PATENT DOCUMENTS

CN 206526682 * 9/2017
DE 102011114465 * 4/2012
(Continued)

OTHER PUBLICATIONS

Office Action dated Feb. 14, 2025, issued in counterpart IN Application No. 202317013570, with English translation. (5 pages).
(Continued)

*Primary Examiner* — Sheng H Davis
(74) *Attorney, Agent, or Firm* — WHDA, LLP

(57) ABSTRACT

A method for purifying combustion exhaust gas, comprising: placing a denitration catalyst in gas stream to remove nitrogen oxides from a combustion exhaust gas, wherein the denitration catalyst comprises a shaped product comprising a catalyst component and having microcracks on the surface of the shaped-product, and 80% to 100% of the microcracks on the number basis have an angle of a longitudinal direction of the microcracks with respect to a main direction of the gas stream within ±30 degrees.

7 Claims, 6 Drawing Sheets

(51) Int. Cl.
    *B01J 21/12*       (2006.01)
    *B01J 23/28*       (2006.01)
    *B01J 35/38*       (2024.01)

(52) U.S. Cl.
    CPC .............. *B01D 2255/20707* (2013.01); *B01D 2255/20723* (2013.01); *B01D 2255/20769* (2013.01); *B01D 2257/404* (2013.01); *B01D 2258/0283* (2013.01); *B01J 35/38* (2024.01); *B01J 2235/00* (2024.01); *B01J 2235/30* (2024.01)

(56) References Cited

U.S. PATENT DOCUMENTS

| | | | |
|---|---|---|---|
| 2016/0166989 A1 | 6/2016 | Nishi et al. | |
| 2017/0165654 A1 | 6/2017 | Shono et al. | |
| 2020/0232368 A1* | 7/2020 | Yamamoto | F01N 3/2828 |

FOREIGN PATENT DOCUMENTS

| | | | |
|---|---|---|---|
| JP | 3-505701 A | 12/1991 | |
| JP | 7-222929 A | 8/1995 | |
| JP | H07222929 | * | 8/1995 |
| JP | 9-155189 A | | 6/1997 |
| JP | 2001132432 A | | 5/2001 |
| JP | 2003-159534 A | | 6/2003 |
| JP | 2004-141711 A | | 5/2004 |
| JP | 2005-169210 A | | 6/2005 |
| JP | 2007-167803 A | | 7/2007 |
| JP | 2007-296449 A | | 11/2007 |
| JP | 2009000671 | * | 1/2009 |
| JP | 2012-183490 A | | 9/2012 |
| JP | 2016-123954 A | | 7/2016 |
| JP | 2017-217590 A | | 12/2017 |
| JP | 2020-114786 A | | 7/2020 |
| KR | 101254068 | * | 4/2013 |
| KR | 20160119061 A | | 10/2016 |
| WO | 2015/012202 A1 | | 1/2015 |
| WO | WO2020116020 | * | 6/2020 |

OTHER PUBLICATIONS

International Search Report dated Oct. 19, 2021, issued in counterpart International Application No. PCT/JP2021/028879 (2 pages).
Office Action dated Jun. 5, 2025, issued in counterpart KR Application No. 10-2023-7007321, with English translation. (10 pages).

\* cited by examiner

[FIG. 1]

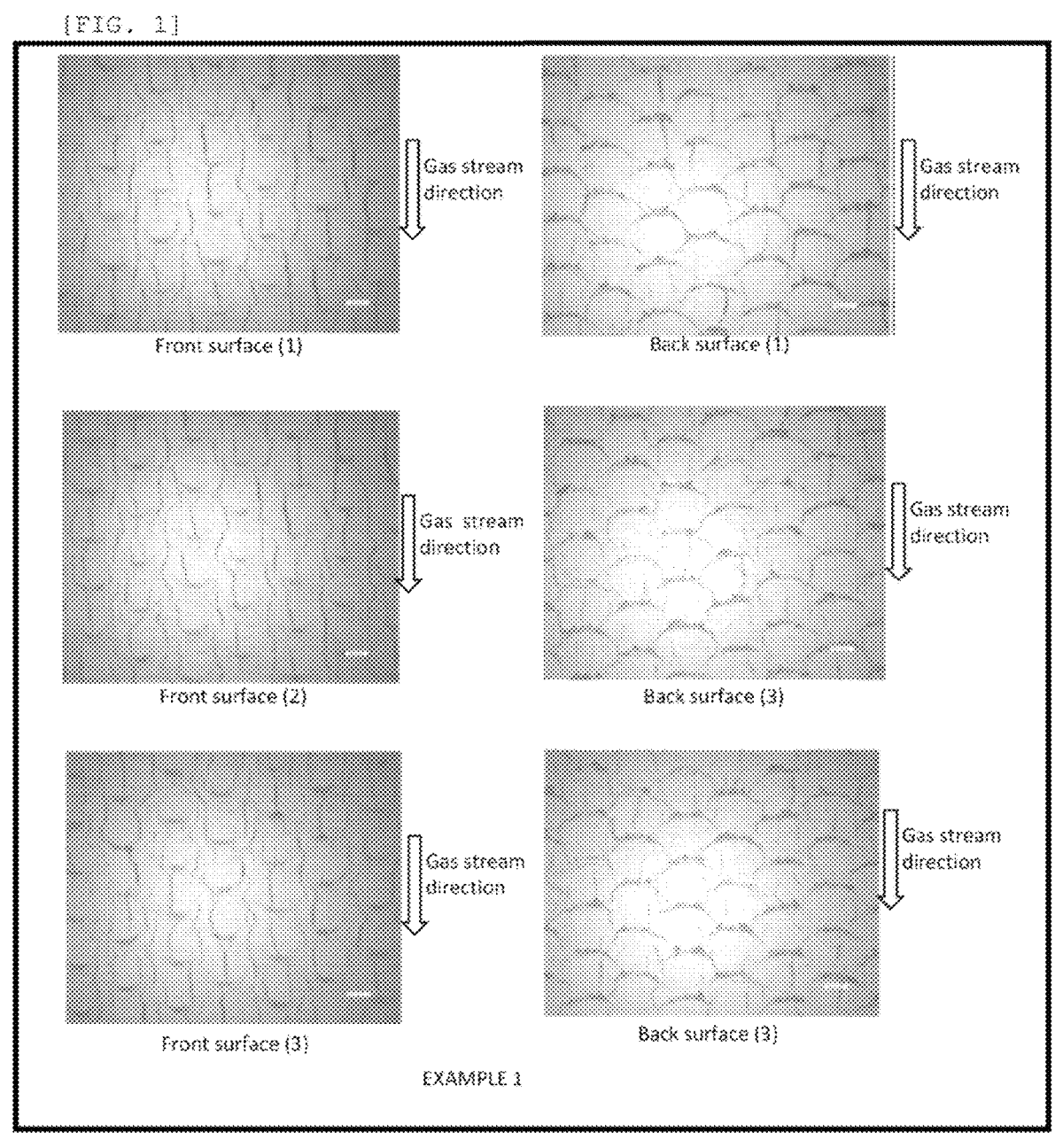

Front surface (1)          Gas stream direction

Back surface (1)          Gas stream direction

Front surface (2)          Gas stream direction

Back surface (3)          Gas stream direction

Front surface (3)          Gas stream direction

Back surface (3)          Gas stream direction

EXAMPLE 1

[FIG. 2]
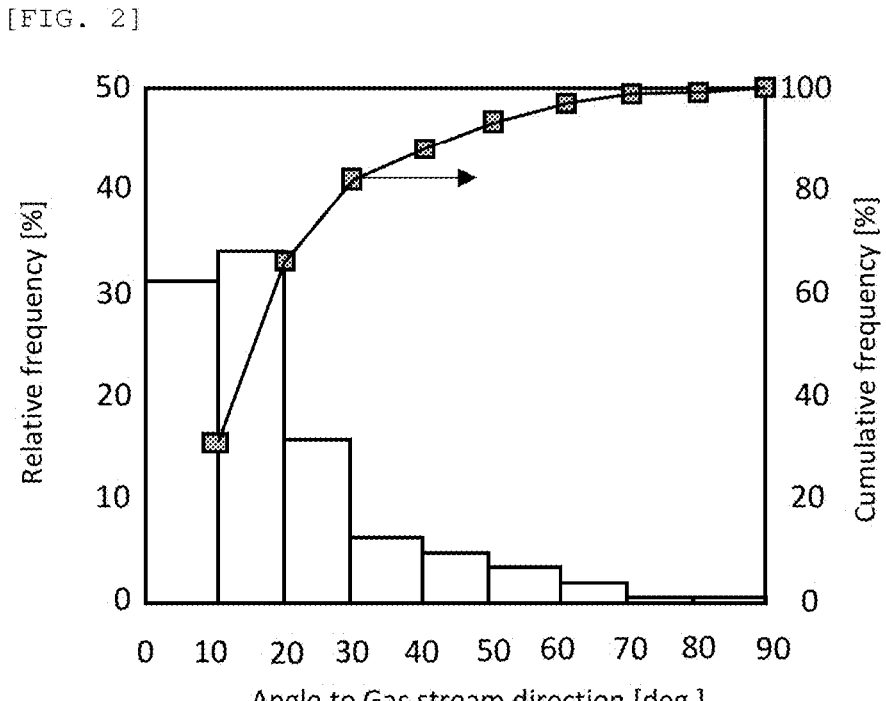

[FIG. 3]
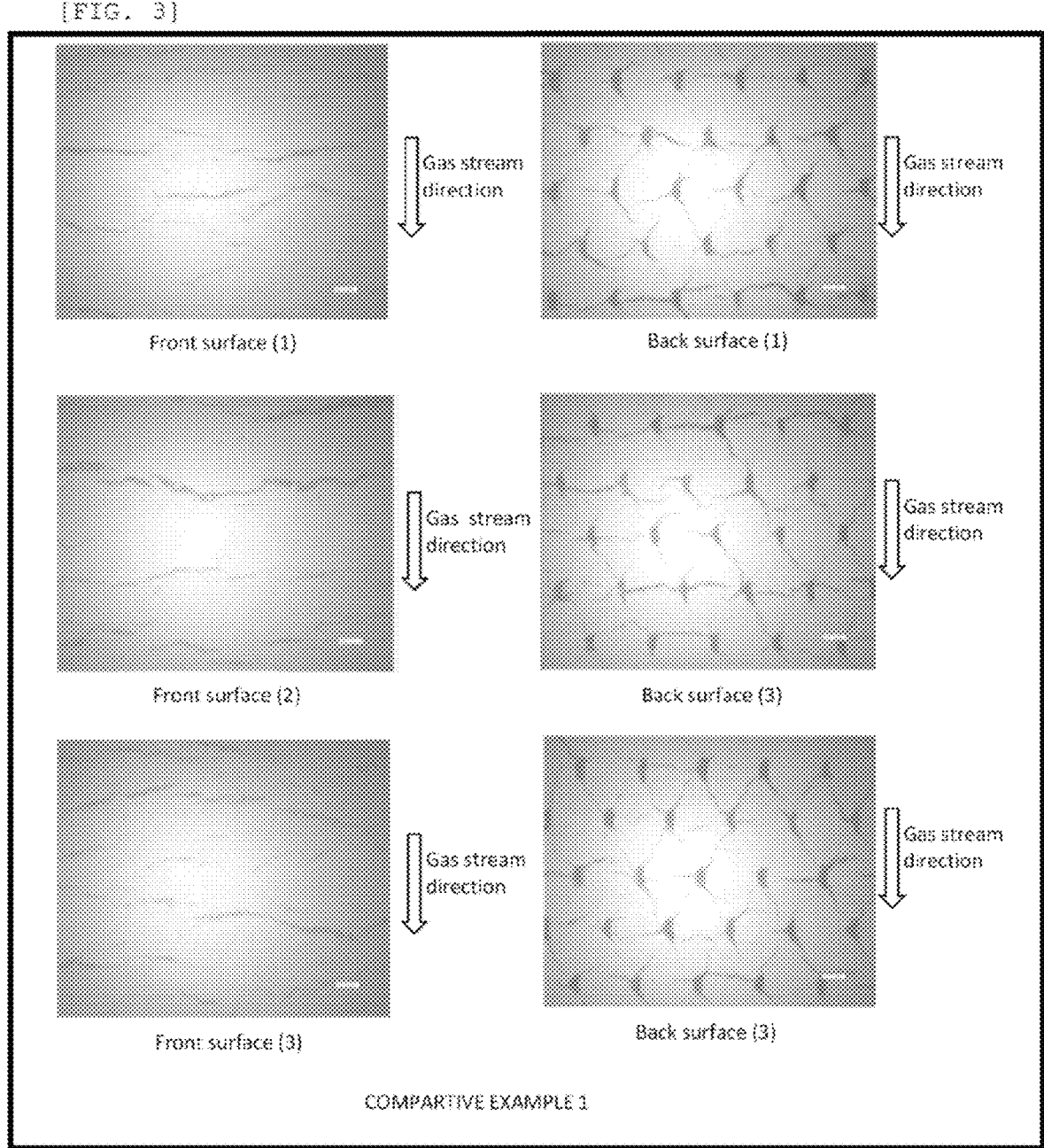

[FIG. 4]
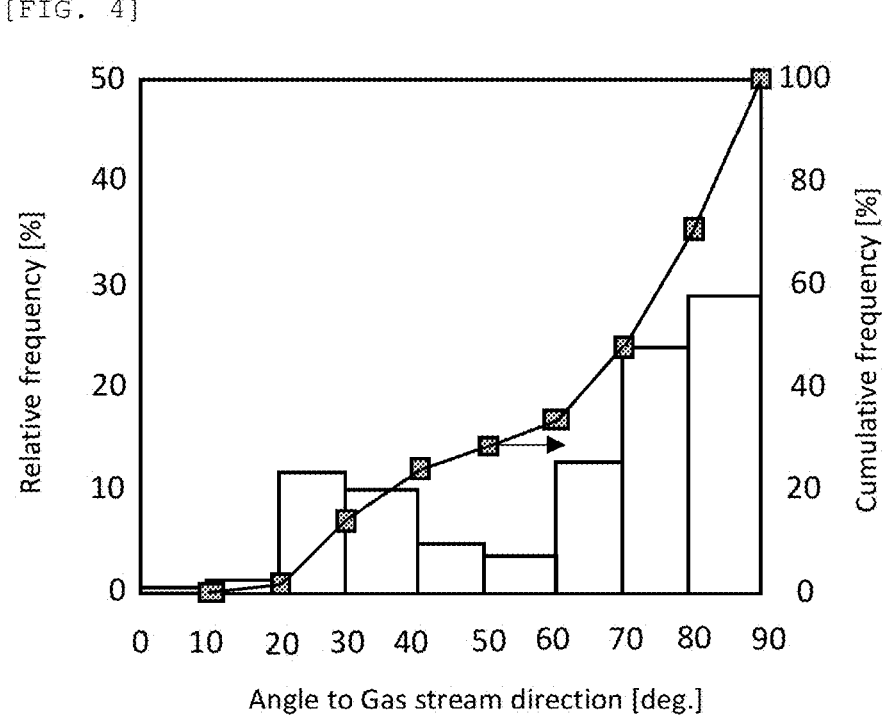
Angle to Gas stream direction [deg.]
[FIG. 5]
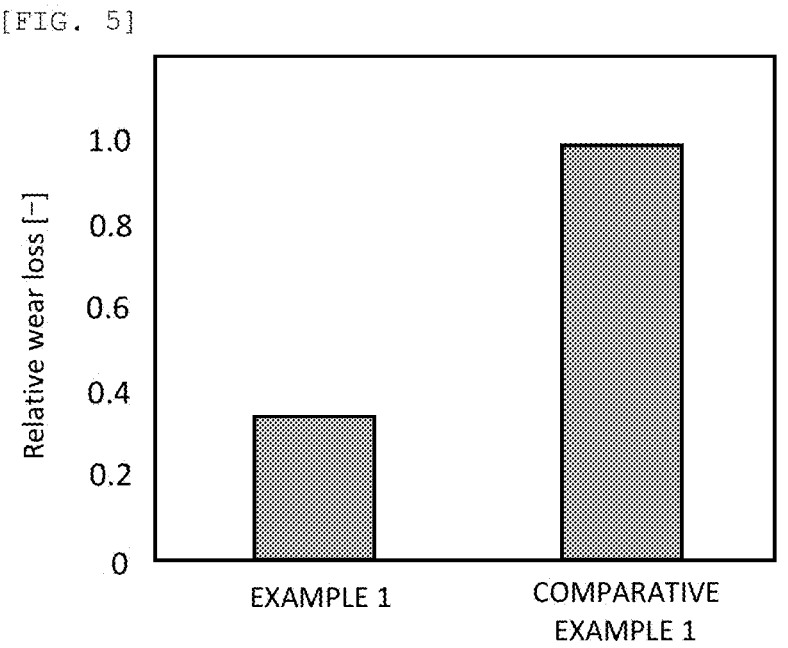

[FIG. 6]
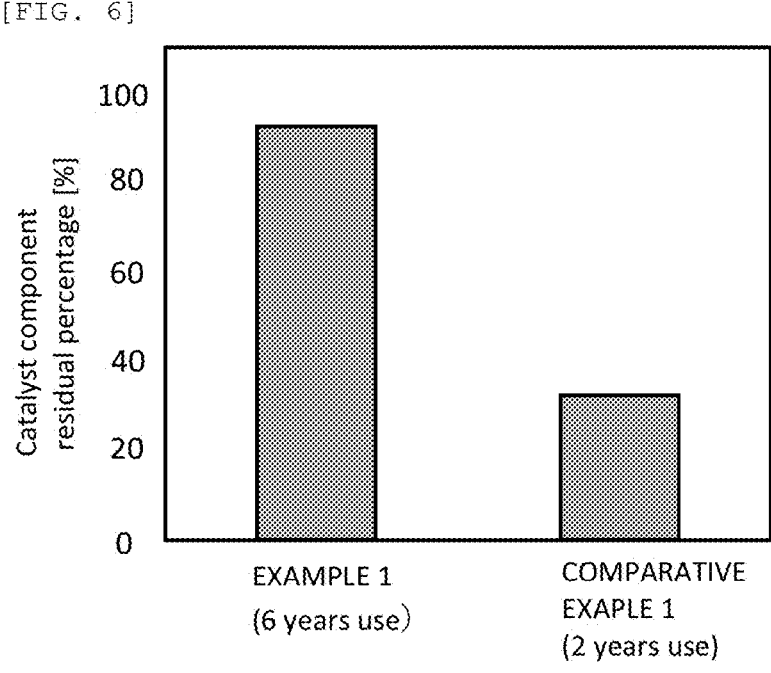
[FIG. 7]
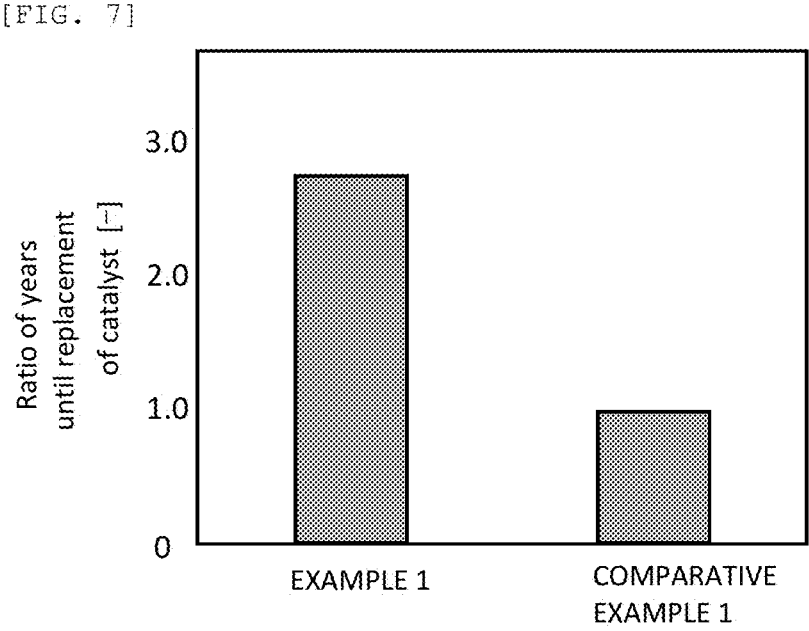

[FIG. 8]
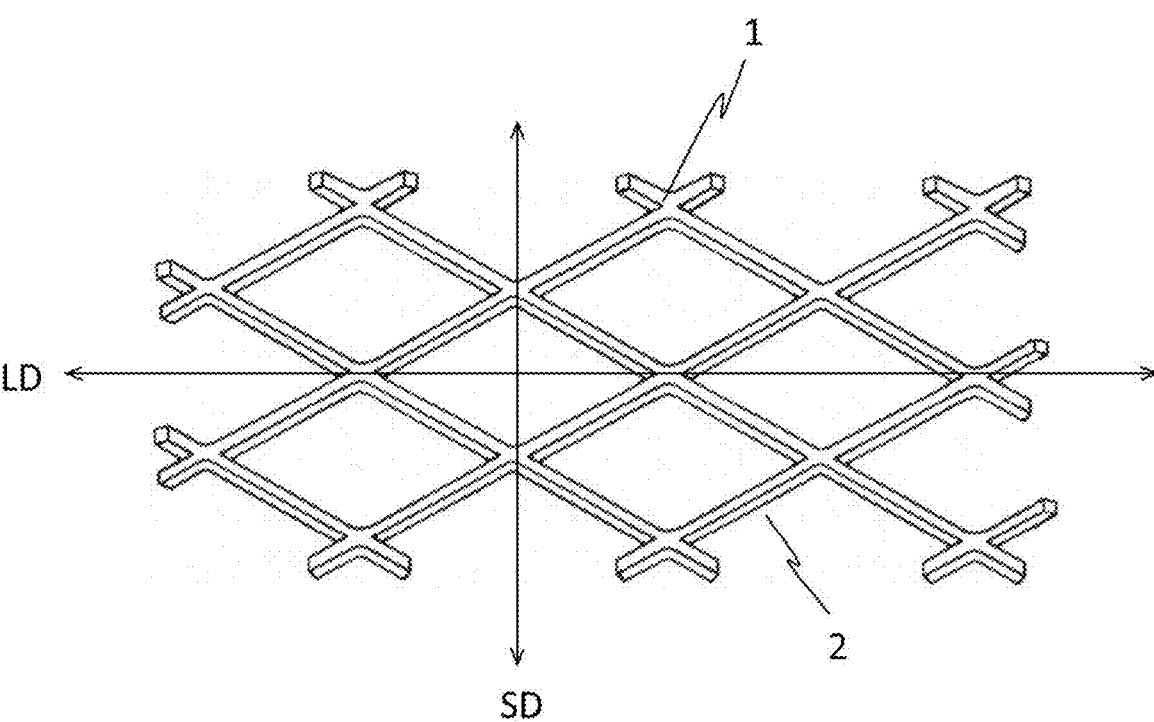
[FIG. 9]
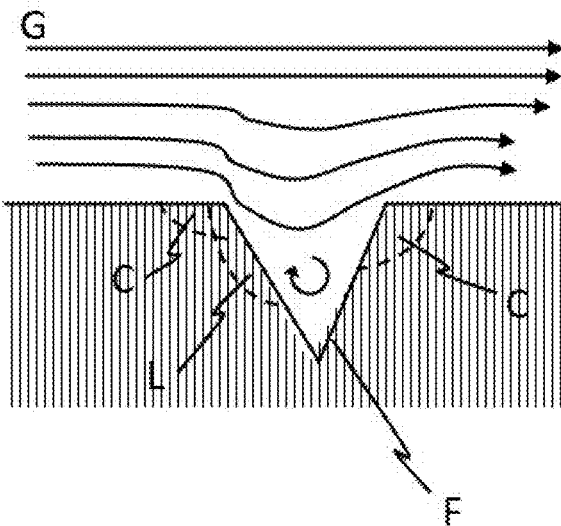

DENITRATION CATALYST AND METHOD FOR PURIFYING EXHAUST GAS

TECHNICAL FIELD

The present invention relates to a denitration catalyst and an exhaust gas purification method. More specifically, the present invention relates to a denitration catalyst excellent in wear-abrasion resistance and peeling resistance and an exhaust gas purification method capable of operating for a long period of time with low replacement frequency of the denitration catalyst.

BACKGROUND ART

As a method for removing nitrogen oxides (NOx) in a flue gas exhausted from electric power plants, various factories, automobiles, or the others, a flue gas denitration method by selective catalytic reduction using a reducing agent such as ammonia ($NH_3$) is known. Titanium oxide ($TiO_2$) based catalyst, zeolite based catalyst, and the like are known as a catalyst used in the denitration method. As the shape of the catalyst, a honeycomb shape, a plate shape, and the like are known.

Exhaust gas from a coal firing boiler may contain a large amount of soot dust. The denitration catalyst may be scraped, worn, or peeled off by the soot dust contained in the exhaust gas. In addition, alkaline components and the like contained in the soot dust may deactivate reaction active sites of the denitration catalyst. As a result, an efficiency of the denitration gradually decreases.

Various denitration catalysts have been proposed from the viewpoint of preventing decrease in denitration efficiency and extending catalyst lifetime.

For example, Patent Document 1 discloses a plate-like denitration catalyst for purifying exhaust gas, in which a catalyst component is supported on a reticulated substrate so as to fill mesh of the reticulated substrate, characterized in that the catalyst component comprises a layer of a first component comprising titanium oxide, silicon oxide, vanadium oxide and/or molybdenum oxide and a layer of a second component comprising molybdenum oxide and vanadium oxide coated on the layer of the first component, a thickness of the filled first component is thinner than a thickness of the reticulated substrate, and the layer of the second component is coated on the layer of the first component and below an outer surface of the reticulated substrate. Patent Document 1 further states that the denitration catalyst used for coal firing boiler exhaust gas is desirably formed with a surface as dense as possible in order to suppress wear when exposed for a long time, and is desirable to have many cracks on the catalyst surface in order to maintain the required denitration performance.

Patent Document 2 discloses a ceramic catalyst carrier for purifying exhaust gas, composed of a ceramic containing cordierite as a main component and having a honeycomb structure wherein bundles of a large number of parallel channels partitioned by partition walls are surrounded by outer peripheral wall, wherein the partition walls has a thickness of 0.04 to 0.15 mm, a thickness of the outer peripheral wall is not less than 0.3 mm, and a microcrack density in an arbitrary cross section of the outer peripheral wall is 0.004 to 0.02 $\mu m/\mu m^2$.

Patent Document 3 discloses a honeycomb catalyst for treating gas exhausted from coal-biomass co-firing, comprising an inorganic oxide carrier comprising Ti, Si and W and a metal component comprising at least one selected from V and Mo, wherein the catalyst has deposit holes with a width of 4 to 20 $\mu m$ and a depth of 20 to 300 $\mu m$, which serve as physical deposit holes of a calcium salt, a total area of openings of the deposit holes accounts for 5 to 10% of a surface area of inner wall of the catalyst, and a difference ($SA_{BET}$–$SA_{Hg}$) between the specific surface area ($SA_{BET}$) measured by the BET method and the specific surface area ($SA_{Hg}$) elicited from catalyst pores of 5 nm to 5 $\mu m$ by the mercury intrusion porosimetry method is in the range of 15 to 25 $m^2/g$.

Patent Document 4 discloses a method for producing a catalyst for exhaust gas purification, comprising forming a groove (tapered groove) at a boundary between a first Rh-containing catalyst coated layer and a second Rh-containing catalyst coated layer, wherein the groove deepens in the depth direction of the Rh-containing catalyst coated layers at a linear gradient from the exhaust gas inlet to the exhaust gas outlet, in the Rh-containing catalyst coated layers.

Patent document 5 discloses a metal honeycomb body, characterized in that the honeycomb body composed of at least partially of a plate comprising at least a first macrostructure; the macrostructure determines honeycomb shape, average channel width and main mechanical properties, wherein the honeycomb body has a plurality of channels with the average channel width through which the fluid can flow in one flow direction, at least a portion of the plate subsidiarily comprises a microstructure in at least a partial area, the microstructure has a height of 0.01 to about 0.3 times the average channel width and at least 15 $\mu m$, wherein the microstructures extend perpendicularly or at any angle to the direction of flow, and are provided continuously in the flow direction at intervals of 1 to 10 mm. Patent document 5 exemplifies the microstructures such as depressions, striations, knots, grooves, or the like that extend perpendicularly or at any angle to the direction of flow and protrude from the plate surface to one or both sides thereof.

CITATION LIST

Patent Literatures

PATENT DOCUMENT 1: JP 2007-296449 A
PATENT DOCUMENT 2: JP H09-155189 A
PATENT DOCUMENT 3: JP 2016-123954 A
PATENT DOCUMENT 4: JP 2017-217590 A
PATENT DOCUMENT 5: JP H03-505701 A

SUMMARY OF THE INVENTION

Problems to be Solved by the Invention

An object of the present invention is to provide a denitration catalyst excellent in wear-abrasion resistance and peeling resistance and a method for purifying an exhaust gas that can be operated for a long period of time with a low replacement frequency of the denitration catalyst.

Means for Solving the Problems

In order to solve the above problems, the present invention including the following aspects has been completed.
{1} A method for purifying combustion exhaust gas, comprising: placing a denitration catalyst in gas stream to remove a nitrogen oxide from a combustion exhaust gas, wherein the denitration catalyst comprises a shaped product comprising a catalyst component and having microcracks on the surface of the shaped product, and 80% to 100% of the microcracks on the number basis have an angle of a longitudinal direction of the microcracks with respect to a main direction of the gas stream within ±30 degrees.

{2} A denitration catalyst for purifying combustion exhaust gas, wherein the denitration catalyst comprises a shaped product comprising a catalyst component, the shaped product has a wall portion configured to form a macro flow channel through which gas mainly flows, a surface of the wall portion has microcracks, and 80% to 100% of the microcracks on the number basis have an angle of a longitudinal direction of the microcracks with respect to a direction of the macro flow channel within ±30 degrees.

{3} A denitration catalyst for purifying combustion exhaust gas, wherein the denitration catalyst comprises a plate shaped product comprising a substrate composed of expanded metal and a catalyst component supported on the substrate so that the catalyst component fills mesh of the expanded metal, the plate shaped product has a wall portion configured to form a macro flow channel through which gas mainly flows, a surface of the wall portion has microcracks, and 80% to 100% of the microcracks on the number basis have an angle of a longitudinal direction of the microcracks with respect to a direction of the macro flow channel within ±30 degrees.

{4} The denitration catalyst according to {3}, wherein the direction of the macro flow channel is substantially parallel to a short direction of the expanded metal.

{5} The denitration catalyst according to {3} or {4}, wherein the catalyst component is carried so that bonds of the expanded metal stand out in the form of dots on the front and back surfaces of the shaped product.

Advantageous Effects of the Invention

The denitration catalyst of the present invention has excellent wear-abrasion resistance and peeling resistance, suppresses a decrease in NOx removal efficiency, and has a long lifetime. The denitration catalyst and purification method of the present invention can be used in removing nitrogen oxides in flue gas, and can be suitably used for removing nitrogen oxides from a gas containing a large amount of soot and dust, such as a gas exhausted from a coal-firing boiler, a gas exhausted from a coal-biomass co-firing boiler and the like. The mechanism by which the effects occur has not been elucidated. As shown in FIG. 9, it can be inferred that the frictional cutting action C increases near the edges of the microcracks because the soot dust-containing gas collides with the edges of the microcracks. In addition, it can be inferred that vortex caused by difference in streamline density produces dynamic lift L that excavates and separates an inner surface of the microcrack. In the present invention, a proportion of microcracks having those longitudinal direction along the direction of gas stream is high. As the longitudinal direction of the microcracks extends along the direction of gas stream, an tilt of the crack side surface becomes gentler. It is thought that the smaller the tilt angle, the lower the gas collision frequency and the smaller the frictional cutting action C. Also, it is thought that the smaller the tilt angle, the smaller the difference in streamline density, and the smaller the excavation action or dynamic lift. In addition, since the surface of the shaped product shrinks when microcracks are formed, it is thought that the shrinkage causes the surface of the shaped product to become denser or higher compactness. Alternatively, it is thought that the stress on the surface of the shaped product is released by the microcracks and the stress on the surface is reduced. For these reasons, it is assumed that the denitration catalyst of the present invention has high strength and is less likely to be worn and peeled off.

BRIEF DESCRIPTION OF THE DRAWINGS

FIG. 1 is a diagram showing optical microscope observation images of the front and back surfaces of the shaped product constituting a denitration catalyst of EXAMPLE.

FIG. 2 is a diagram showing frequency distribution of an angle of longitudinal direction of microcrack with respect to gas stream direction, in the shaped product constituting the denitration catalyst of EXAMPLE.

FIG. 3 is a diagram showing optical microscope observation images of the front and back surfaces of the shaped product constituting the denitration catalyst of COMPARATIVE EXAMPLE.

FIG. 4 is a diagram showing frequency distribution of an angle of longitudinal direction of microcrack with respect to gas stream direction, in the shaped product constituting the denitration catalyst of COMPARATIVE EXAMPLE.

FIG. 5 is a diagram showing relative wear losses of the denitration catalysts of EXAMPLE 1 and COMPARATIVE EXAMPLE 1.

FIG. 6 is a diagram showing catalyst component residual percentages of the denitration catalysts of EXAMPLE 1 and COMPARATIVE EXAMPLE 1.

FIG. 7 is a diagram showing catalyst replacement age ratios of the denitration catalysts of EXAMPLE 1 and COMPARATIVE EXAMPLE 1.

FIG. 8 is a diagram showing an example of expanded metal.

FIG. 9 is a conceptual diagram roughly showing the gas flow around the crack.

EMBODIMENTS FOR CARRYING OUT THE INVENTION

The denitration catalyst of the present invention comprises a shaped product comprising a catalyst component.

The shaped product constituting the denitration catalyst of the present invention can be in the form of, for example, a honeycomb, a plate, a cardboard, or the like. A honeycomb-shaped product can be obtained, for example, by extruding a catalyst component. A plate-shaped product can be obtained, for example, by impregnating or coating a plate-shaped substrate such as metal lath (expanded metal, perforated metal, etc.), inorganic fiber woven fabric or inorganic fiber non-woven fabric with a catalyst component. The catalyst component is preferably supported so as to fill meshes or textures of the substrate. Among these substrates, expanded metal is preferred. Examples of the plate-shaped product can include those having a flat portion and a ridge portion. A plurality of plate-shaped products can be used by piling each other so that the ridge portion abut on the flat portion to form a gap between the flat portions. The cardboard-shaped product is obtained, for example, by stacking a flat plate-shaped product and a corrugated plate-shaped product in contact with each other so that a gap is formed between the flat portions. The corrugated plate-shaped product or the shaped product having flat portions and ridge portions can be obtained, for example, by subjecting a flat plate-shaped product to bending press shaping or the like.

The shaped product constituting the denitration catalyst of the present invention has a wall portion configured to form macro flow channels through which gas mainly flows. In the denitration catalyst comprising a plate-shaped product, the wall portion is the plate-shaped product itself. The wall portion is a portion forming a side shared by adjacent polygonal holes in the honeycomb denitration catalyst.

It is preferable that the shaped product constituting the denitration catalyst of the present invention is formed so that direction of the macro flow channel is substantially parallel to short direction of an expanded metal that is the substrate. In addition, the catalyst component is preferably carried in the shaped product constituting the denitration catalyst of the present invention so that bonds of the expanded metal stand out in the form of dots on the front and back surfaces of the shaped product.

As the catalyst component, mentioned can be a titanium-based catalyst comprising a titanium oxide, a molybdenum and/or tungsten oxide, and a vanadium oxide; a zeolite-based catalyst mainly comprising an aluminosilicate such as zeolite and a metal such as Cu and Fe supported on the aluminosilicate; and those obtained by mixing the titanium-based catalyst and the zeolite-based catalyst. Among these, the titanium-based catalyst is preferred.

Examples of the titanium-based catalyst can include a Ti—V—W catalyst, a Ti—V—Mo catalyst, and a Ti—V—W—Mo catalyst.

A proportion of V element to Ti element is preferably not more than 2% by weight, more preferably not more than 1% by weight, as a weight percentage of $V_2O_5/TiO_2$. A proportion of Mo element and/or W element to Ti element is preferably not more than 10% by weight, more preferably not more than 5% by weight, as a weight percentage of $(MoO_3+WO_3)/TiO_2$, when molybdenum oxide and/or tungsten oxide are/is used.

Titanium oxide powder or a titanium oxide precursor can be used as a raw material for titanium oxide in the production of the shaped product. As the titanium oxide precursor, mentioned can be a titanium oxide slurry, a titanium oxide sol; titanium sulfate, titanium tetrachloride, a titanate, a titanium alkoxide, and the like. In the present invention, as a raw material for the titanium oxide, one that forms anatase-type titanium oxide is preferably used.

As a raw material for vanadium oxide, used can be a vanadium compound such as vanadium pentoxide, ammonium metavanadate, and vanadyl sulfate.

Ammonium paratungstate, ammonium metatungstate, tungsten trioxide, tungsten chloride or the like can be used as a raw material for tungsten oxide.

Ammonium molybdate, molybdenum trioxide or the like can be used as a raw material for molybdenum oxide.

The shaped product used in the present invention can comprise, as a promoter or an additive, an oxide of P, an oxide of S, an oxide of Al (e.g. alumina), an oxide of Si (e.g. glass fiber), an oxide of Zr (e.g. zirconia), gypsum (e.g. gypsum dihydrate), zeolite, or the like. These can be used in the form of powder, sol, slurry, fiber, or the like, when producing the shaped product.

The shaped product constituting the denitration catalyst of the present invention has a microcrack on its surface (or surface of the wall portion).

Cracks are roughly classified into nanocrack, microcrack, and macrocrack. The openings of cracks on the surface of the shaped product are darker than the background color in an image observed with a scanning electron microscope. In the present invention, a black portion observed when an image observed by a scanning electron microscope is converted into two-gradation of black and white by an image processing apparatus with a pixel size of 2 μm is regarded as a crack. Cracks smaller than the pixel size are indistinguishable from the background color and become white as a result of the two-gradation. Therefore, in the present invention, they are regarded as nanocracks and excluded from microcracks. On the other hand, it is preferable that the shaped product constituting the denitration catalyst of the present invention has no macrocracks on its surface. The macrocrack has a crack width of more than 500 μm. Macrocracks may affect mechanical resistance of the shaped product and may cause delamination, falling off, breakage, or the like. In addition, when the shape of the substrate (for example, bond 1 or strand 2 of an expanded metal) stands out on the surface of the shaped product, black areas caused by the standing out are excluded from macrocracks and microcracks.

The microcracks in the present invention preferably have a 95% crack width of not more than 100 μm. The 95% crack width is a width value $B_{95}$ when a cumulative percentage reaches 95% by accumulating from the smallest width in a length-based cumulative distribution of all measured crack width values. Although a 5% crack width of microcracks is not particularly limited, it is preferably not less than 2 μm. The 5% crack width is a width value $B_5$ when a cumulative percentage reaches 5% by accumulating from the smallest width in the length-based cumulative distribution of all measured crack width values. In the present invention, the length-based cumulative distribution is created for a crack width range of not less than 2 μm and not more than 500 μm. In addition, an average value of intervals between the cracks is preferably 200 to 500 μm.

The microcracks preferably have in-plane anisotropy in direction. Specifically, the number of microcracks having an angle of the longitudinal direction of the microcracks with respect to the main direction of the gas stream or the direction of the macro flow channel being within ±30 degrees is 80 to 100% of the total number of the microcracks. The angle of the longitudinal direction of the microcrack with respect to the main direction of the gas stream or the direction of the macro flow channel is defined as an acute angle at the intersection of direction of the line segment connecting both ends of one microcrack and the main direction of the gas stream or the direction of the macro flow channel, within the surface of the shaped product.

The microcracks can be obtained by controlling an amount of the catalyst component, an amount of water, kneading conditions, shaping conditions, configuration of the substrate, drying conditions, firing conditions or the like to be used when producing the shaped product. The microcracks are presumed to be caused by stress concentrations in drying shrinkage, structural bending, tensile forces, shear forces, configuration of the substrate or the others. The longitudinal direction of the microcracks can be controlled by adjusting an amount of bled water, pressure direction (or direction of pressure roll) during shaping, pressure distribution during shaping, entrainment of air during shaping, temperature or humidity during drying, anisotropy of the substrate or the others so as to produce anisotropy in stress concentrations resulting from drying shrinkage, structural bending, tensile forces, shear forces, configuration of the substrate or the others. Then, a group of shaped products having microcracks satisfying the predetermined statistical values of the present invention can be selected from the obtained shaped products to be used in a denitration apparatus.

The method for purifying combustion exhaust gas of the present invention comprises: placing the above denitration catalyst in a stream of combustion exhaust gas, such that a number of microcracks having an angle of the longitudinal direction of the microcracks with respect to the main direction of the gas stream being within ±30 degrees is 80 to 100% of the total number of the microcracks, to remove nitrogen oxides from the combustion exhaust gas. The combustion exhaust gas can be purified, for example, by passing the combustion exhaust gas and a reducing agent (ammonia) through a fixed bed packed with the denitration catalyst of the present invention.

The denitration catalyst of the present invention maintains its denitration performance over a long period of time without being easily worn or peeled off even if the combustion exhaust gas contains a large amount of soot and dust. Therefore, it can be suitably used for purifying gas discharged from boilers in thermal power plants, factories, or the like.

Example 1

To titanium oxide powder, molybdenum trioxide, ammonium metavanadate and silica sol were added, aluminum compound powder and alumina silicate fiber were further added to obtain a mixture, and the obtained mixture was kneaded, while adding water for adjusting the water content, to obtain a catalyst paste. The water content was adjusted so that microcracks were uniformly formed. The catalyst paste was applied to a long substrate composed of expanded metal, and then pressed between hard metal finishing rolls to obtain a flat plate shaped compact. The shaped compact was dried at 120° C. for 1 hour. Next, the shaped compact dried was placed in a firing furnace, the temperature was raised from room temperature to 500° C. over 2 hours, maintained at 500° C. for 2 hours, and then lowered to room temperature over 2 hours to obtain a shaped product. FIG. 1 shows optical microscopy images of randomly selected regions on the front and back surfaces of the shaped product obtained. Bonds of the expanded metal have stood out in dots on the front and back surfaces. Most of the microcracks have been formed along a short direction SD of the expanded metal. FIG. 2 shows the frequency distribution of an angle of longitudinal direction of the microcrack with respect to a direction of the gas stream. This shaped product was used as a denitration catalyst.

Grids having an average particle size of 500 μm were allowed to drop freely and collide with a test piece of the denitration catalyst at a predetermined grid amount, drop distance and incident angle so as to be substantially parallel to the main longitudinal direction of the microcracks. A weight change (wear loss) before and after this collision treatment was measured. Then, the ratio (relative wear loss) of the wear loss to a wear loss of a shaped product obtained in COMPARATIVE EXAMPLE 1 described later was calculated. The result is shown in FIG. 5.

Comparative Example 1

To titanium oxide powder, molybdenum trioxide, ammonium metavanadate and silica sol were added, aluminum compound powder and alumina silicate fiber were further added to obtain a mixture, and the obtained mixture was kneaded, while adding water for adjusting the water content, to obtain a catalyst paste. The water content was adjusted so that microcracks were uniformly formed. The catalyst paste was applied to a long substrate composed of expanded metal, and then pressed between soft resin finishing rolls to obtain a flat plate shaped compact. The shaped compact was dried at 120° C. for 1 hour. Next, the shaped compact was placed in a firing furnace, the temperature was raised from room temperature to 500° C. over 2 hours, maintained at 500° C. for 2 hours, and then lowered to room temperature over 2 hours to obtain a shaped product. FIG. 3 shows optical microscopy images of randomly selected regions on the front and back surfaces of the shaped product obtained. Bonds of the expanded metal have stood out in dots on only the back surface. FIG. 4 shows the frequency distribution of an angle of longitudinal direction of the microcrack with respect to a direction of the gas stream. This shaped product was used as a denitration catalyst.

Grids having an average particle size of 500 μm were allowed to drop freely and collide with a test piece of the denitration catalyst at a predetermined grid amount, drop distance and incident angle so as to be substantially perpendicular to the main longitudinal direction of the microcracks. A weight change (wear loss) before and after this collision treatment was measured.

The denitration catalyst of EXAMPLE 1 and the denitration catalyst of COMPARATIVE EXAMPLE 1 were installed in a denitration apparatus of a coal firing thermal power plant, and commercial operation was performed. After two years of the commercial operation, the denitration catalyst of COMPARATIVE EXAMPLE 1 was severely worn and peeled off, and only about 30% of the applied catalyst component remained (see FIG. 6), so it was replaced with a new denitration catalyst. The denitration catalyst of EXAMPLE 1 was hardly worn or peeled off, so it was used for another 4 years. After 6 years of the commercial operation, the denitration catalyst of EXAMPLE 1 still had about 90% of the applied catalyst component remaining, but the NOx removal efficiency had declined slightly, so it was replaced with a new denitration catalyst. The results are shown in FIGS. 6 and 7.

CODE EXPLANATION

1: Bond
2: Strand
SD: Short direction
LD: Long direction

The invention claimed is:

1. A method for purifying combustion exhaust gas by using denitration catalyst,
the denitration catalyst comprising:
a shaped product comprising a catalyst component supported on a substrate;
wherein the substrate is denitration composed of expanded metal having mesh the shaped product is a plate shaped product including the catalyst component supported on the substrate so that the catalyst component fills the mesh;
wherein a plurality of microcracks, each of which has a 95% crack width of not more than 100 μm, are formed on the surface of the shaped product,
the method comprising: placing the denitration catalyst in a stream of the combustion exhaust gas to remove nitrogen oxides from the combustion exhaust gas, such that an angle between an extending direction of the microcrack and a stream direction of the combustion exhaust gas for 80-100% of the plurality of microcracks is within ±30 degrees.

2. The denitration catalyst according to claim 1, wherein an extending direction of the macro flow channel is parallel to the short direction of the mesh.

3. The denitration catalyst according to claim 2, wherein the catalyst component is carried to the substrate so that the bonds stand out in the form of dots on the front and back surfaces of the shaped product.

4. The denitration catalyst according to claim 1, wherein the expanded metal has bonds for bonding strands constituting the mesh, wherein the catalyst component is carried so that the bonds stand out in the form of dots on the front and back surfaces of the shaped product.

5. The method according to claim 1, wherein the plurality of microcracks do not include a macrocrack, each of which has a crack width of more than 500 $\mu$m.

6. A denitration catalyst for purifying combustion exhaust gas, comprising;

a shaped product and comprising a catalyst component supported on a substrate;

wherein the substrate is denitration composed of expanded metal having mesh the shaped product is a plate shaped product including the catalyst component supported on the substrate so that the catalyst component fills the mesh;

wherein a plurality of microcracks, each of which has a 95% crack width of not more than 100 $\mu$m, are formed on the surface of the shaped product, wherein the shaped product has a wall portion configured to form a macro flow channel through which the combustion exhaust gas flows, and wherein denitration catalyst is provided in the macro flow channel such that an angle between an extending direction of the microcrack and a stream direction of the combustion exhaust gas for 80-100% of the plurality of microcracks is within ±30 degrees.

7. The denitration catalyst according to claim 6, wherein the plurality of microcracks do not include a macrocrack, each of which has a crack width of more than 500 $\mu$m.

\* \* \* \* \*